United States Patent [19]
Nakayama

[11] Patent Number: 5,499,324
[45] Date of Patent: Mar. 12, 1996

[54] GRAPHIC DISPLAY APPARATUS WITH IMPROVED SHADING CAPABILITIES

[75] Inventor: Noriko Nakayama, Kawasaki, Japan

[73] Assignee: Fujitsu Limited, Kawasaki, Japan

[21] Appl. No.: 184,102

[22] Filed: Jan. 21, 1994

[30] Foreign Application Priority Data

Mar. 18, 1993 [JP] Japan .................... 5-059130

[51] Int. Cl.$^6$ ................................... G06T 15/50
[52] U.S. Cl. ............................ 395/129; 395/126
[58] Field of Search .................... 395/118, 122, 395/125, 126, 129, 130

[56] References Cited

U.S. PATENT DOCUMENTS

| | | | |
|---|---|---|---|
| 4,862,391 | 8/1989 | Ohhashi | 364/522 |
| 5,083,287 | 1/1992 | Obata et al. | 395/126 |
| 5,163,126 | 11/1992 | Einkauf et al. | 395/123 |
| 5,253,339 | 10/1993 | Well et al. | 395/126 |
| 5,379,371 | 1/1995 | Usami et al. | 395/128 |

FOREIGN PATENT DOCUMENTS 4-225482  8/1992  Japan .

OTHER PUBLICATIONS

Foley, James D. et al, "*Computer Graphics: Principles and Practices,*" Addison–Wesley Publishing Co., 1990, pp. 258–261 and 734–739.

Vaisey, Jacques et al, "Image Compression with Variable Block Size," *IEEE Transactions on Signal Processing*, Aug. 1992, pp. 2040–2060.

*Primary Examiner*—Heather R. Herndon
*Assistant Examiner*—Rudolph J. Buchel
*Attorney, Agent, or Firm*—Nikaido, Marmelstein, Murray & Oram

[57] ABSTRACT

A graphic display apparatus includes a geometry transforming part for inputting graphic data of a target object and transforming the graphic data into coordinate values of a device coordinate system which is used by the graphic display apparatus, an area calculation part for calculating an area of a polygon which generates an image based on the transformed coordinate values of the device coordinate system, a shading technique selection part for selecting a shading technique corresponding to the area of the polygon calculated by the area calculation part from a plurality of shading techniques which are determined in advance depending to the calculated area, a luminance calculation part for calculating a luminance of the graphic data of the target object according to the shading technique selected by the shading technique selection part, and a dot developing part for developing the graphic data of the target object for which the luminance is calculated by the luminance calculation part into dots.

10 Claims, 8 Drawing Sheets

GRAPHIC DISPLAY APPARATUS WITH IMPROVED SHADING CAPABILITIES

BACKGROUND OF THE INVENTION

The present invention generally relates to graphic display apparatuses, and more particularly to a graphic display apparatus which carries out a shading process.

Recently, it has become popular to generate a three-dimensional image on a computer. The user is demanding more realistic images, and there are also demands to realize a real-time process.

When generating the three-dimensional image, there is a large load on a process of calculating the luminance of graphics. Hence, in order to generate the image in real-time, it is necessary to efficiently carry out the luminance calculation.

A description will be given of a display technique employed in an example of a conventional graphic display apparatus. FIG. 1 shows the construction of the conventional graphic display apparatus, and FIGS. 2A and 2B are diagrams for explaining the process of this conventional graphic display apparatus.

A modeling transforming part 20 of the conventional graphic display apparatus shown in FIG. 1 combines graphics which are described in respective modeling coordinate systems MC as shown in FIG. 2A, based on input graphic data, and transforms the coordinate systems so that the input graphic data are described in a common world coordinate system WC. On the other hand, a luminance calculating part 21 calculates a luminance of the graphic data described in the world coordinate system WC as indicated by I in FIG. 2B. In FIG. 2B, each portion having a low luminance is indicated by a dotted shading. A visual field (or field of vision) transforming part 22 transforms the graphic data for which the luminance is calculated into graphic data describing the same graphic viewed from a different visual point (or point of vision). In this case, the coordinate system is transformed from the world coordinate system WC into a normalized projection coordinate system NPC when the visual field transforming part 22 carries out the transformation. The normalized projection coordinate system NPC is a normalized coordinate system as indicated by II in FIG. 2B.

A clip part 23 clips a desired portion of the image which is transformed in the visual field transforming part 22, as indicated by III in FIG. 2B. After this clipping, the clipped image portion is supplied to a work station transforming part 24 which transforms the normalized projection coordinate system NPC into a device coordinate system DC. The device coordinate system DC conforms to a coordinate system employed in a display device 28. For example, the display device 28 is a cathode ray tube (CRT).

After the transformation in the work station transforming part 24, a dot developing part 25 develops the graphic data into dot data. A Z-buffer 26 stores depth values of the graphic data. If the graphic has an overlapping portion, a three-dimensional image is displayed by displaying the graphic data having the depth value which corresponds to the front along the depth direction. The graphic data which are subjected to the dot developing process and the depth control process are stored in a frame buffer 27 and displayed on the display device 28.

Next, a description will be given of the luminance calculation. The luminance calculation is carried out in the luminance calculating part 21 by transforming the modeling coordinate systems of vertex coordinate values and normal vectors related to a polygon which is input into the world coordinate system in the modeling transforming part 20. This input polygon has three-dimensional polygonal surfaces approximating the shape of an object. The modeling coordinate systems are the coordinate systems which describe the graphics and are used when the user defines the graphics. In addition, the world coordinate system is the coordinate system in which these graphics are combined to form the object.

When calculating the luminance, the shading technique is set as the attribute. When this shading technique is once set, this shading technique is effective with respect to all polygons input thereafter, and the shading technique is fixed until the next shading technique is set.

Next, a description will be given of the shading techniques which are popularly used.

1) Constant Shading (or Flat Shading) Technique

This technique calculates the luminance only once with respect to one polygon, and a color obtained by the luminance calculation is assigned to the entire polygon.

2) Gouraud Shading Technique:

The luminance is calculated with respect to each of the vertexes of the polygon, and a linear interpolation is made within the polygon.

3) Phong Shading Technique:

The normal is interpolated in place of the luminance value at each vertex of the polygon, and the luminance is calculated for each dot. Since the luminance is calculated in units of dots, it is possible to obtain a realistic image. However, the amount of calculation required is extremely large.

The Phong shading technique is desirable if the three-dimensional image is to be displayed realistically. However, the Phong shading technique calculates the luminance in units of dots, and the real-time processing is virtually impossible because of the extremely large amount of calculation that is required.

On the other hand, a graphic display apparatus has been proposed in a Japanese Laid-Open Patent Application No. 4-225482. This proposed graphic display apparatus selects the shading technique depending on the distance from the visual point to the polygon.

The operating principle of this proposed graphic display apparatus is as follows. That is, in order to make a realistic display of a three-dimensional image, it is not necessary to make the entire image realistic, and it is sufficient to make the realistic display for only the image portion which is close to the visual point. In addition, since the image portion which is distant from the visual point and forms the background does not need to be displayed realistically, no problem is introduced even if the shading technique used for such an image portion cannot realize a highly realistic display.

Accordingly, by using the Phong shading technique or the like which enables a highly realistic display with respect to the image portion which is close to the visual point of the image, and using the constant shading technique, the Gouraud shading technique or the like which is inferior with regard to the realistic nature but can carry out the required calculation within a short time with respect to the image portion (or background) which is distant from the visual point, it becomes possible to make a realistic display of the image as a whole and to carry out the necessary processing in real-time.

FIG. 3 is a block diagram for explaining the operating principle of this proposed graphic display apparatus. FIG. 3 shows a shading technique selection part 30 which selects the shading technique to be used.

In FIG. 3, the user first sets a distance threshold value 31, a first shading technique 34 and a second shading technique 35. It is assumed for the sake of convenience that the first shading technique 34 is the Gouraud shading technique or the constant shading technique which only requires a small amount of calculation, and that the second shading technique 35 is the Phong shading technique which requires a large amount of calculation.

A visual point distance calculating part 32 calculates a distance between the visual point and an target polygon. A shading technique judging part 33 selects the shading technique by comparing the distance calculated by the visual point distance calculating part 32 and the distance threshold value 31 which is set in advance. More particularly, the shading technique judging part 33 selects the first shading technique 34 if the distance calculated by the visual point distance calculating part 32 is greater than the distance threshold value 31, and selects the second shading technique 35 if the distance calculated by the visual point distance calculating part 32 is smaller than or equal to the distance threshold value 31.

Accordingly, the shading process is carried out with respect to the image portion which is close to the visual point of the image by using the Phong shading technique which enables the realistic display. On the other hand, the shading process is carried out with respect to the image portion (or background) which is distant to the visual point of the image by using the constant shading technique or the Gouraud shading technique which does not enable a realistic display when compared to the Phong shading technique but can carry out the calculation within a short time. As a result, both realistic display and real-time processing can be satisfied with respect to the image as a whole.

However, even if the distance from the visual point to the polygon is far, there are cases where the polygon appears relatively large on the screen (or display). In such cases, the realistic nature of the entire image deteriorates if the polygon although distant from the visual point is subjected to the shading process using the constant shading technique or the Gouraud shading technique which does not enable a realistic display.

FIGS. 4A and 4B are diagrams for explaining the relationship of the distance from the visual point to the polygon and the realistic nature of the displayed image.

As shown in FIG. 4A, if the area of a background portion 36 which is distant from the visual point is small on the screen, it is possible to obtain a satisfactory image which is realistic as a whole by using the Phong shading technique with respect to a portion 37 which is close to the visual point of the image.

But if the area on the screen of a background portion 36' which is distant from the visual point is large on the screen as shown in FIG. 4B, the Phong shading technique is used with respect to a small polygon 37' which is close to the visual point of the image, and the constant shading technique or the Gouraud shading technique is used with respect to the large background 36' which is distant from the visual point. As a result, the proposed graphic display apparatus had a problem in that the realistic nature of the image as a whole greatly deteriorates in such a case.

SUMMARY OF THE INVENTION

Accordingly, it is a general object of the present invention to provide a novel and useful graphic display apparatus in which the problem described above is eliminated.

Another and more specific object of the present invention is to provide a graphic display apparatus comprising geometry transforming means for inputting graphic data of a target object and transforming the graphic data into coordinate values of a device coordinate system which is used by the graphic display apparatus, area calculation means, coupled to the geometry transforming means, for calculating an area of a polygon which generates an image based on the transformed coordinate values of the device coordinate system, shading technique selection means, coupled to the geometry transforming means, for selecting a shading technique corresponding to the area of the polygon calculated by the area calculation means from a plurality of shading techniques which are determined in advance depending to the calculated area, luminance calculation means, coupled to the shading technique selection means, for calculating a luminance of the graphic data of the target object according to the shading technique selected by the shading technique selection means, and dot developing means, coupled to the luminance calculation means, for developing the graphic data of the target object for which the luminance is calculated by the luminance calculation means into dots. According to the graphic display apparatus of the present invention, a simple shading process is carried out with respect to an object having a small area on a screen, that is, an object which appears small on the screen and does not need to be described in detail. On the other hand, a more complex shading process is carried out with respect to an object having a large area on the screen, so that the details of the large object can be displayed. As a result, it is possible to display a realistic image at a high speed. In addition, since the shading techniques which are set may be switched, the user can arbitrarily set the threshold value of the polygon area to carry out an optimum shading process which suits the needs. Moreover, if the polygon surface is divided into a plurality of triangles and areas of the triangles are obtained when obtaining the polygon area, it becomes possible to easily calculate the polygon area within a short time.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 5.

Figure 1:
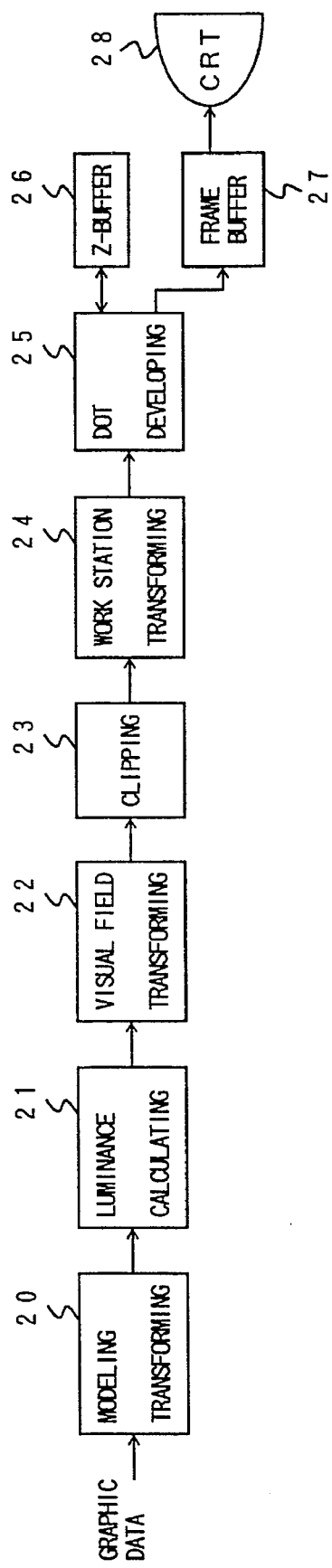
FIG. 1 is a system block diagram showing an example of a conventional graphic display apparatus.
Figure 2A:
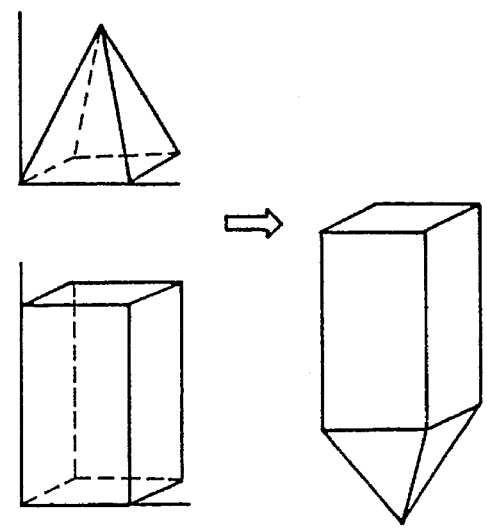
FIGS. 2A and 2B respectively are diagrams for explaining the process of the conventional graphic display apparatus shown in FIG. 1.
Figure 2B:
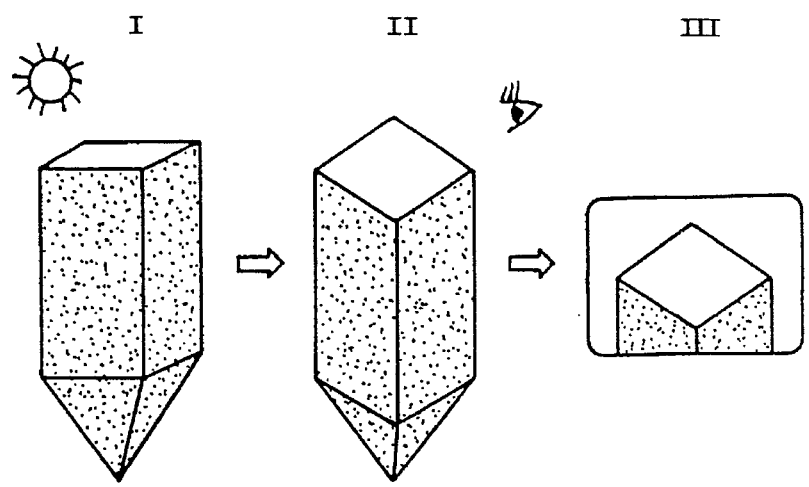
Figure 3:
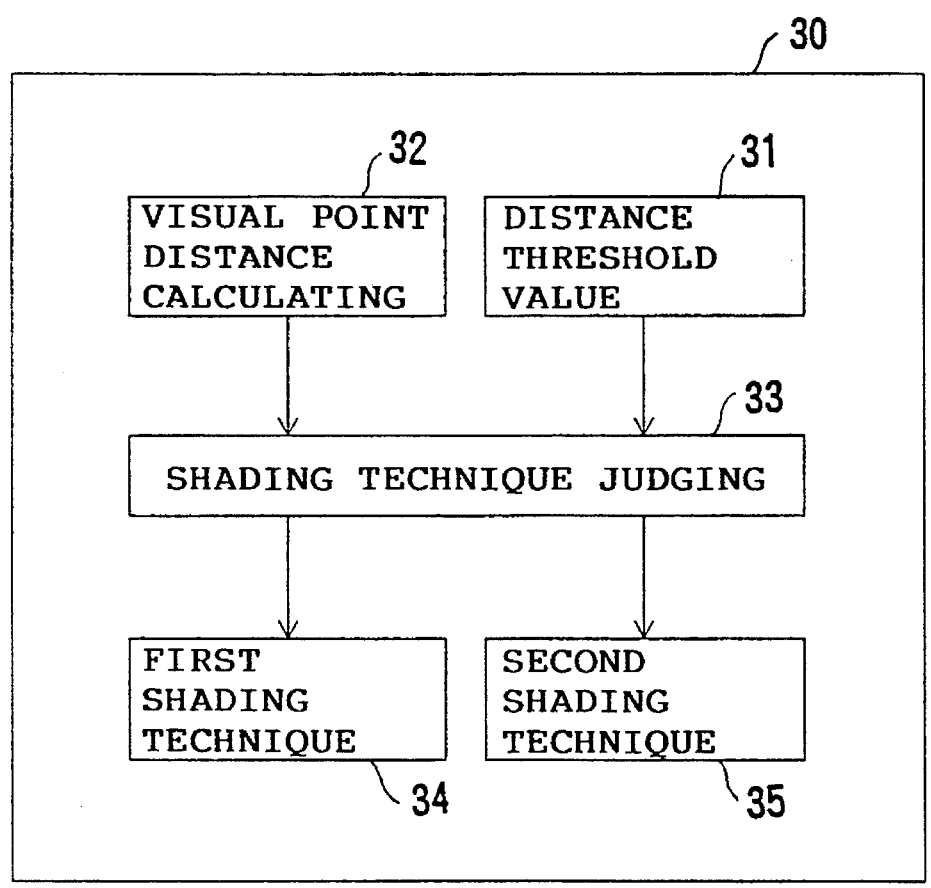
FIG. 3 is a system block diagram showing a shading technique selection part which selects the shading technique to be used in a previously proposed graphic display apparatus.
Figure 4A:
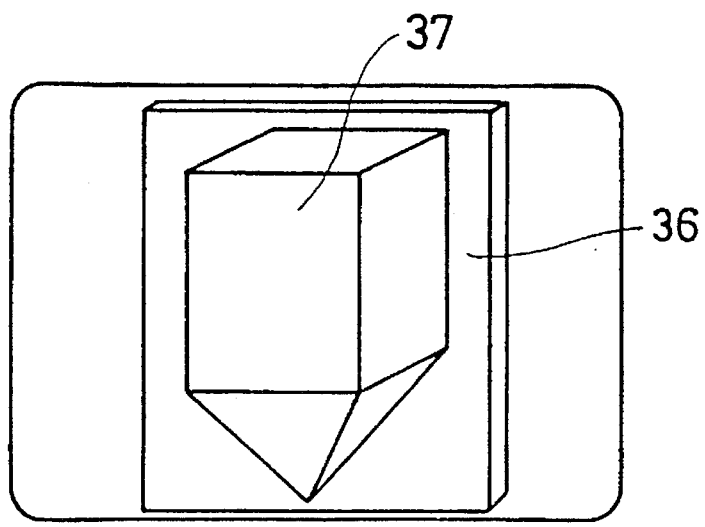
FIGS. 4A and 4B respectively are diagrams for explaining the relationship of the distance from the visual point to the polygon and the realistic nature of the displayed image.
Figure 4B:
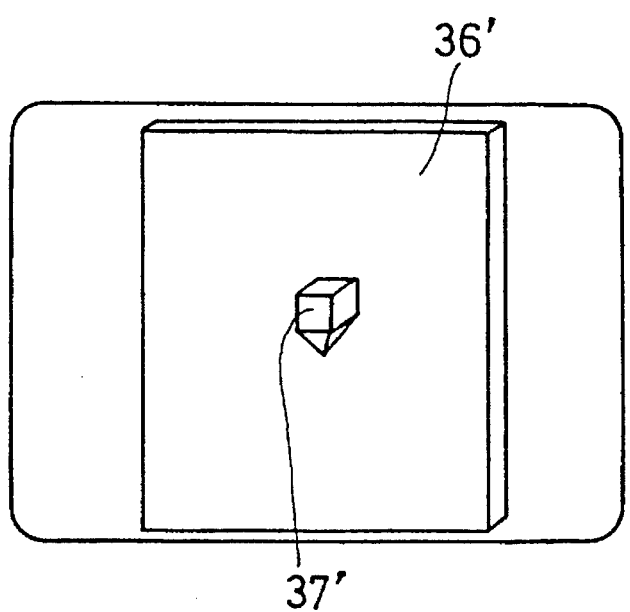
Figure 5:
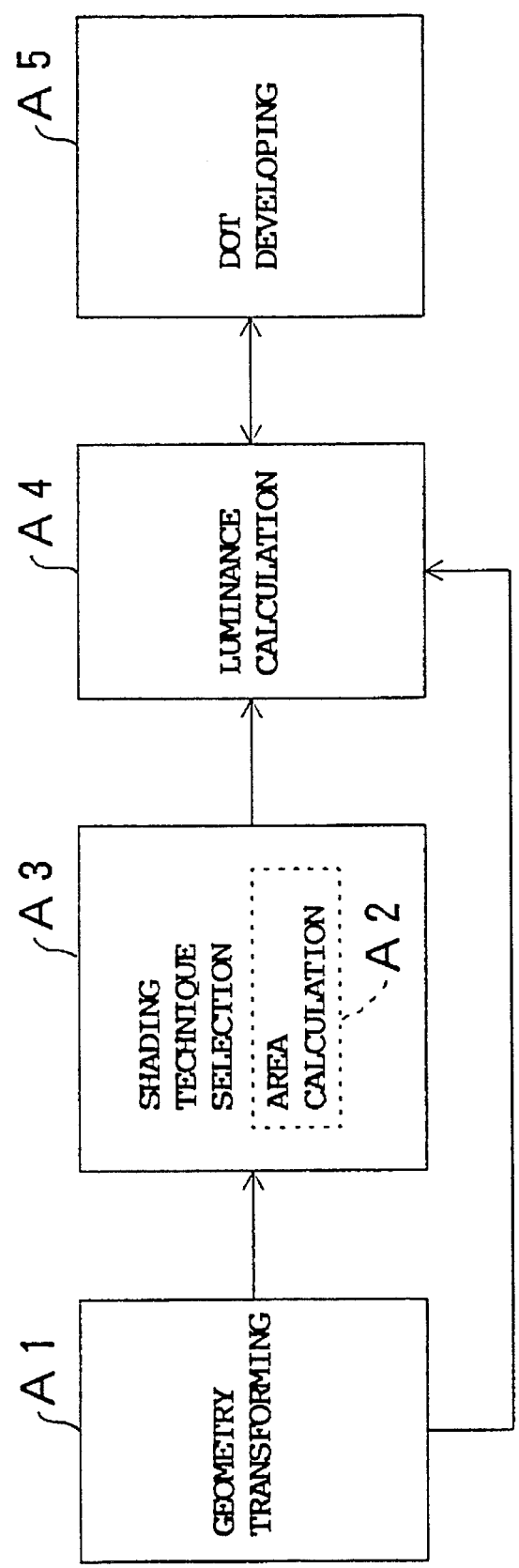
FIG. 5 is a system block diagram for explaining the operating principle of the present invention.

As shown in FIG. 5, a graphic display apparatus according to the present invention generally includes a geometry transforming part A1, a shading technique selection part A3 having an area calculation part A2, a luminance calculation part A4, and a dot developing part A5.

The geometry transforming part A1 inputs graphic data of a target object and transforms the graphic data into coordinate values of a device coordinate system which is used by the graphic display apparatus. The area calculation part A2 calculates an area of a polygon which generates the image based on the transformed coordinate values of the device coordinate system. The shading technique selection part A3 selects a shading technique corresponding to the calculated area of the polygon from shading techniques which are determined in advance according to the calculated area. The luminance calculation part A4 calculates a luminance of the graphic data of the target object according to the selected shading technique. The dot developing part A5 develops the graphic data of the target object for which the luminance is calculated into dots.

The shading technique selection part A3 may be constructed to freely set the combination of the shading technique and the area of the polygon described by the coordinate values of the device coordinate system transformed in the geometry transforming part A1 in response to an instruction from the user.

In addition, the area calculation part A2 may be constructed to calculate the total area of the polygon by dividing the surface of the polygon in the device coordinate system into a plurality of triangles and obtaining a sum total of the areas of each of the triangles.

The geometry transforming part A1 carries out coordinate transformation and clipping. In other words, the geometry transforming part A1 transforms the vertex coordinates of the polygon and the normal vectors which are described in the modeling coordinate system MC into corresponding values in the normalized projection coordinate system NPC. Thereafter, the geometry transforming part A1 carries out the clipping and transforms the coordinate system from the normalized projection coordinate system NPC into the device coordinate system DC.

The area calculation part A2 divides the surface of the polygon which generates the image into triangles, for example, based on the coordinates of the device coordinate system DC transformed by the geometry transforming part A1, and obtains the areas of each of the triangles obtained by the division based on information related to the vertex coordinates of each of the triangles. By dividing the polygon surface into a plurality of triangles and obtaining the areas of each of the triangles, it becomes possible to obtain the area of the polygon using simple operation formulas.

The shading technique selection part A3 sets the shading technique depending on the area of the polygon obtained by the area calculation part A2. The user sets in advance a threshold value of the polygon area and the kinds of shading techniques that may be selected. Hence, the area is calculated from the input polygon, and it is possible to select the shading technique with respect to the target object from the shading techniques which are set in advance by the user depending on whether the polygon area is greater than the threshold value or is less than or equal to the threshold value.

The luminance calculation part A4 calculates the luminance according to the shading technique which is selected by the shading technique selection part A3. If the shading technique selected by the shading technique selection part A3 is the constant shading technique or the Gouraud shading technique, for example, the luminance calculation is carried out in units of the vertexes of the polygon. Since the luminance calculation is carried out in the world coordinate system WC, an inverse transformation process is carried out to transform the coordinate values and the normal vectors from the normalized projection coordinate system NPC to the world coordinate system WC. When the luminance calculation ends, the coordinate values and the colors of the vertexes of the polygon are supplied to the dot developing part A5.

On the other hand, if the shading technique selected by the shading technique selection part A3 is the Phong shading technique, for example, the luminance calculation is carried out in units of dots using normal vectors between the vertexes which are subjected to linear interpolation. For this reason, the vertex coordinates and normal vectors of the device coordinate system DC are subjected to the dot development (linear interpolation) in the dot developing part A5, and the coordinate values and normal vectors of each of the dots are transferred to the luminance calculation part A4 and the luminance calculation is carried out by making an inverse transformation from the device coordinate system DC to the world coordinate system WC. After the luminance calculation ends, the coordinate of each dot forming the polygon is transformed from the world coordinate system WC into the device coordinate system DC and is transmitted to the dot developing part A5.

By carrying out the series of processes described above, the shading process is carried out using the shading technique which does not make an extremely realistic display but has the high calculation speed, with respect to the polygon having a small area in the device coordinate system DC, that is, the small polygon the details of which are unclear. On the other hand, the shading process is carried out using the shading technique which has the low calculation speed but makes a satisfactorily realistic display, with respect to the polygon having a large area in the device coordinate system DC. As a result, it is possible to satisfy the demands for both the realistic display and the real-time processing with respect to the image as a whole.

In addition, because the polygon surface is divided into the triangles when calculating the polygon area, it is possible to efficiently obtain the polygon area.

Furthermore, since the combination of the shading techniques which may be selected by the shading technique selection part A3 can be modified and selected arbitrarily depending on the instruction from the user, it is possible to arbitrarily set the shading technique in correspondence with the image to be processed.

Figure 6:
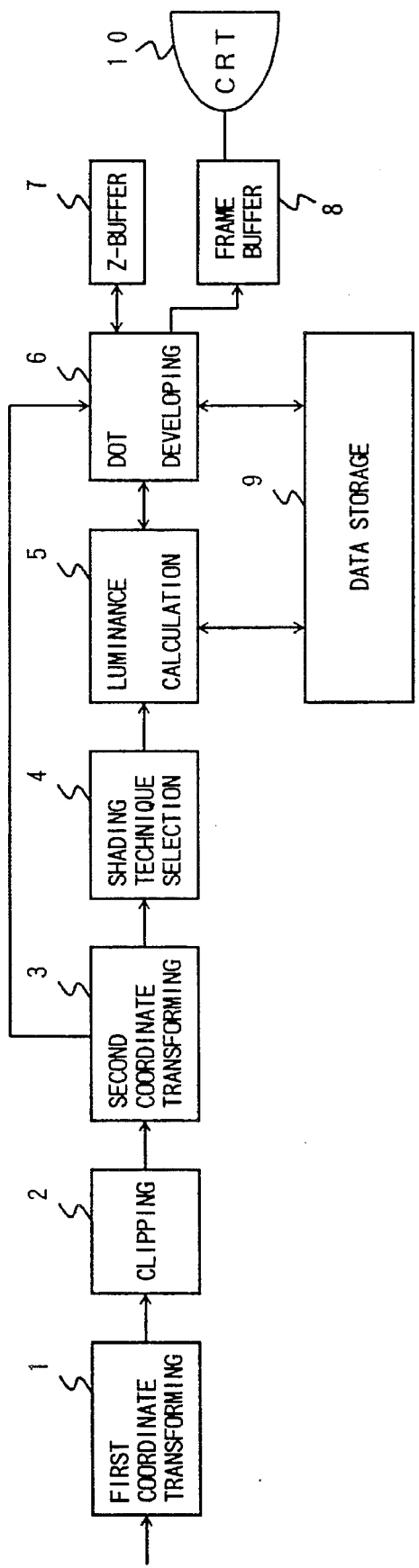
FIG. 6 is a system block diagram showing an embodiment of a graphic display apparatus according to the present invention.

Next, a description will be given of an embodiment of a graphic display apparatus according to the present invention. FIG. 6 shows the construction of this embodiment.

In FIG. 6, a first coordinate transforming part 1 inputs vertex data related to a polygon in the modeling coordinate system MC, and transforms the modeling coordinate system MC into the normalized projection coordinate system NPC. In this embodiment, the vertex data related to the polygon include the coordinate values, the colors, and the normal vectors. A clipping part 2 carries out a clipping process which extracts (clips) a desired portion within a clipping boundary value, that is, within the display range of a display device 10. For example, the display device 10 is a CRT. A second coordinate transforming part 3 transforms the coordinate system of the vertex data related to the polygon from the normalized projection coordinate system NPC into the device coordinate system DC.

Figure 7:
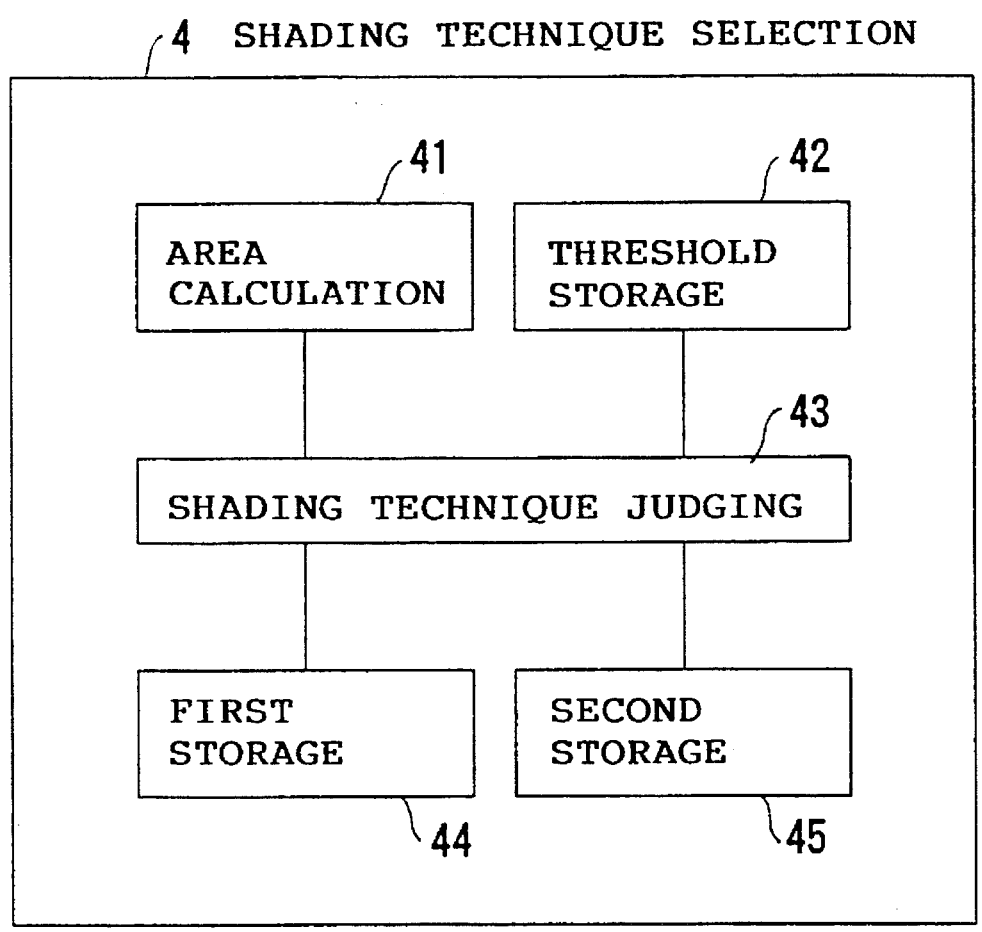
FIG. 7 is a system block diagram showing a shading technique selection part shown in FIG. 6.

A shading technique selection part 4 forms an important part of this embodiment. This shading technique selection part 4 includes the function of selecting the shading technique from the polygon area in the device coordinate system DC. FIG. 7 shows the construction of the shading technique selection part 4.

As shown in FIG. 7, the shading technique selection part 4 includes an area calculation part 41, a threshold storage 42, a shading technique judging part 43, and first and second storages 44 and 45. The area calculation part 41 calculates the polygon area in the device coordinate system DC, and the threshold storage 42 stores the threshold value of the polygon area. The shading technique judging part 43 selects the shading technique by comparing the polygon area calculated in the area calculation part 41 and the threshold value stored in the threshold storage 42. The first and second storages 44 and 45 store programs of the shading techniques.

First, the user sets the threshold value of the polygon area and various shading techniques. The set threshold value of the polygon area is stored in the threshold storage 42. On the other hand, the set various shading techniques are independently stored in the first and second storages 44 and 45.

The shading technique judging part 43 selects the shading technique based on the difference between the polygon area calculated in the area calculation part 41 and the threshold value of the polygon area stored in the threshold storage 42. More particularly, if the calculated polygon area is smaller than or equal to the threshold value, the shading technique judging part 43 selects a first shading technique I. On the other hand, the shading technique judging part 43 selects a second shading technique II if the calculated polygon area is larger than the threshold value. In this embodiment, the first storage 44 stores the first shading technique I which requires a small amount of calculation, and the second storage 45 stores the second shading technique II which requires a large amount of calculation.

Figure 8:
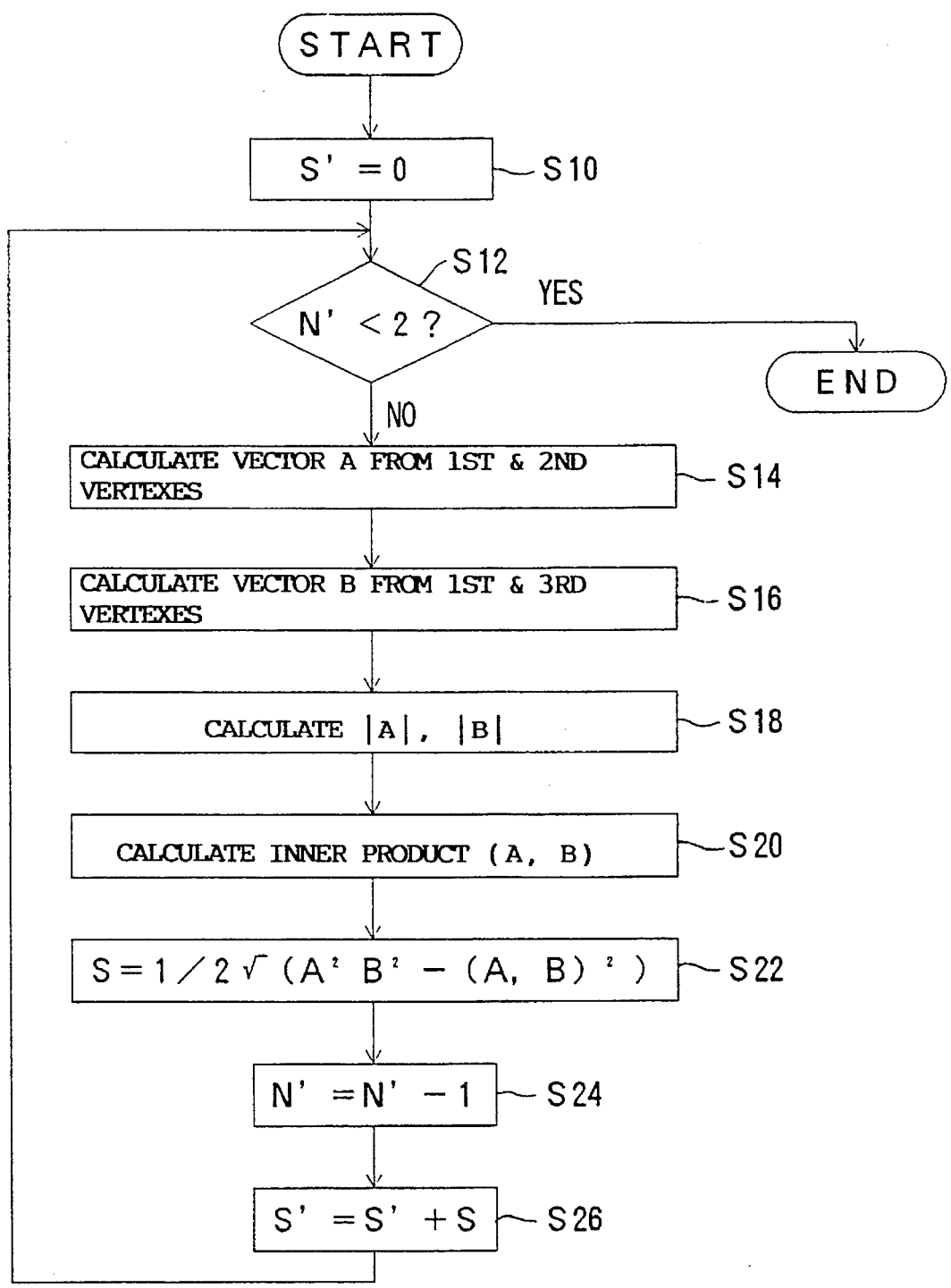
FIG. 8 is a flow chart for explaining the operation of an area calculation part shown in FIG. 6.

FIG. 8 is a flow chart for explaining an area calculation process of the area calculation part 41. In this embodiment, the surface of the polygon in the device coordinate system DC is divided into a plurality of triangles, and the total area of the polygon is calculated by obtaining the sum total of the areas of each of the triangles. A description will hereinafter be given of the area calculation process of the area calculation part 41 by referring to FIG. 8, assuming that the polygon has N vertexes.

When the area calculation process shown in FIG. 8 is started, a step S10 carries out an initializing process by clearing a total area S' of the polygon to 0. Then, a step S12 decides whether or not a counter value N' is less than 2. As will be described later, the counter value N' is decremented by 1 in a step S24 every time the main routine is carried out once. In the initial state, the counter value N' is equal to N which indicates the number of vertexes of the polygon.

As described above, this embodiment divides the surface of the polygon having N vertexes into a plurality of triangles when obtaining the polygon area. In the case of the polygon having N vertexes, it is possible to divide the polygon surface into (N-2) triangles. Hence, the areas of all of the triangles are obtained by carrying out the main routine (N'-2) times. For this reason, if the decision result in the step S12 is YES, it is regarded that the areas of all of the triangles have been obtained and the process ends.

On the other hand, if the decision result in the step S12 is NO, the process advances to a step S14. The step S14 calculates a vector A from first and second vertexes of a triangle the area of which is to be obtained this time. Then, a step S16 calculates a vector B from first and third vertexes of the triangle the area of which is to be obtained this time. A step S18 calculates magnitudes |A| and |B| of the vectors A and B which are respectively calculated in the steps S14 and S16. In addition, a step S20 calculates an inner product (A, B) of the vectors A and B.

Thereafter, a step S22 obtains an area S of the triangle which is to be obtained based on the following formula using the calculated results of the steps S18 and S20.

$$S = (1/2) \cdot \sqrt{\{|A|^2 \times |B|^2 - (A, B)^2\}}$$

When the area A of the triangle which is to be obtained this time is obtained based on the above formula, the step S24 decrements the counter value N' by 1. In addition, a step S26 adds the area S obtained this time to a total area S' of the polygon, and regards a sum as the total area S' of the polygon. The process then returns to the step S12, and the total area S' of the polygon is obtained by carrying out the above described processes (N'-2) times.

Therefore, according to this embodiment, it is possible to efficiently obtain the polygon area within a short time because the polygon surface is divided into the triangles and the areas of the triangles are calculated in order to obtain the total area S' of the polygon.

Next, the construction of the remaining part of this embodiment will be given by referring back to FIG. 6.

In FIG. 5, a luminance calculation part 5 calculates the luminance from vertex colors and light source information related to a light source. In the case of the constant shading technique or the Gouraud shading technique, the luminance calculation is made in units of vertexes. On the other hand, in the case of the Phong shading technique, the luminance calculation is made in units of dots. The coordinate values and the normal vectors in the world coordinate system WC are used when making the luminance calculation, and thus, an inverse transformation is made from the device coordinate system DC into the world coordinate system WC. In addition, when outputting the calculated luminance, a transformation is made from the world coordinate system WC into the device coordinate system DC.

A dot developing part 6 develops vertex data related to the polygon into dots. When making this development, the dot developing part 6 makes a reference to a Z-buffer 7 and Z-values of the dots are compared. If the present incoming Z-value is in front relative to the depth of the image, the Z-value of the dot is newly updated in the Z-buffer 7, and a color (red, green, blue) is written into a frame buffer 8. A data storage 9 is used as a common memory for the luminance calculation part 5 and the dot developing part 6. The display device 10 displays on its screen the color of the dot stored in the frame buffer 8.

When the Phong shading technique is selected as the shading technique, it is necessary to carry out the processing in units of dots. Hence, in this case, the data to be processed are supplied from the second coordinate transforming part 3 to the dot developing part 6 and developed into dots, and are thereafter input to the luminance calculation part 5 via the data storage 9.

Next, a description will be given of a specific operation of the shading technique selection part 4 shown in FIG. 7. In this embodiment, the shading technique selection part 4 is constructed so that the combination of the polygon area and the shading technique can be set freely by the instruction from the user. Because the shading techniques can be set arbitrarily, it is possible to arbitrarily set the shading technique in correspondence with the image which is to be processed.

First, a description will be given of the operation of the shading technique selection part 4 when the constant shading technique is set in the first storage 44 and the Gouraud shading technique is set in the second storage 45.

When the polygon area is less than or equal to the threshold value, the shading technique judging part 43 selects the first storage 44, that is, the constant shading technique. In the case of the constant shading technique, the luminance calculation is made by transforming the coordinate system of the coordinate value and the normal vector related to 1 vertex from the device coordinate system DC to the world coordinate system WC, and the same color is assigned to the entire polygon.

On the other hand, when the polygon area is greater than the threshold value, the shading technique judging part 43 selects the second storage 45, that is, the Gouraud shading technique. In the case of the Gouraud shading technique, the luminance calculation is made by transforming the coordinate system of the coordinate values and the normal vectors related to all of the vertexes from the device coordinate system DC to the world coordinate system WC.

In either case where the polygon area is less than or equal to the threshold value or is greater than the threshold value, the coordinate value of the vertex and the calculated color are supplied to the dot developing part 6 and the developed into dots.

Next, a description will be given of the operation of the shading technique selection part 4 when the Gouraud shading technique is set in the first storage 44 and the Phong shading technique is set in the second storage 45.

When the polygon area is less than or equal to the threshold value, the shading technique judging part 43 selects the first storage 44, that is, the Gouraud shading technique. In the case of the Gouraud shading technique, the luminance calculation is made by transforming the coordinate system of the coordinate values and the normal vectors related to all of the vertexes from the device coordinate system DC to the world coordinate system WC. The coordinate system of the coordinate values of the vertexes and the calculated colors is transformed from the world coordinate system WC into the device coordinate system DC, and the coordinate values of the vertexes and the calculated colors are supplied to the dot developing part 6 and developed into dots.

On the other hand, when the polygon area is greater than the threshold value, the shading technique judging part 43 selects the second storage 45, that is, the Phong shading technique. In the case of the Phong shading technique, the luminance calculation is made in units of dots. In this case, the data from the second coordinate transforming part 3 are supplied directly to the dot developing part 6 and are developed into dots using the data storage 9 as a work area and input to the luminance calculation part 5. The luminance calculation part 5 transforms the coordinate system from the device coordinate system DC into the world coordinate system WC and calculates the luminance of each dot. Thereafter, the luminance calculation part 5 transforms the coordinate system from the world coordinate system WC into the device coordinate system DC and outputs the calculated luminance to the dot developing part 6.

Therefore, according to this embodiment, a simple shading process is carried out with respect to an object having a small area on the screen (display device 10), that is, an object which appears small on the screen and does not need to be described in detail. On the other hand, a mope complex shading process is carried out with respect to an object having a large area on the screen, so that the details of the large object can be displayed. As a result, it is possible to display a realistic image at a high speed. In addition, since the shading techniques which are set may be switched, the user can arbitrarily set the threshold value of the polygon area to carry out an optimum shading process which suits the needs. Moreover, since the polygon surface is divided into a plurality of triangles and the areas of the triangles are obtained when obtaining the polygon area, it is possible to easily calculate the polygon area within a short time.

Further, the present invention is not limited to these embodiments, but various variations and modifications may be made without departing from the scope of the present invention.

What is claimed is:

1. A graphic display apparatus comprising:

geometry transforming means for inputting graphic data of a target object and transforming the graphic data into coordinate values of a device coordinate system which is used by the graphic display apparatus;

area calculation means, coupled to said geometry transforming means, for calculating an area of a particular polygon that is formed by the transformed coordinate values of the device coordinate system;

shading technique selection means, coupled to said geometry transforming means, for selecting a shading technique corresponding to the area of the particular polygon calculated by said area calculation means from a plurality of shading techniques which are determined in advance depending upon the calculated area, said shading technique selection means selecting a shading technique which enables a first degree of realistic representation when the area of the polygon calculated by the area calculation means is larger than a threshold value, and selects a shading technique with a second degree of realistic representation, lower than said first degree of realistic representation, when the area of the polygon calculated by the area calculation means is not larger than the threshold value;

luminance calculation means, coupled to said shading technique selection means, for calculating a luminance of the graphic data of the target object according to the shading technique selected by said shading technique selection means for the particular polygon; and dot developing means, coupled to said luminance calculation means, for developing the graphic data of the target object for which the luminance is calculated by said luminance calculation means into dots.

2. The graphic display apparatus as claimed in claim 1, further comprising display means, coupled to said dot developing means, for displaying the target object based on the graphic data obtained via said dot developing means.

3. The graphic display apparatus as claimed in claim 1, wherein said shading technique selection means selects the shading technique in response to an external instruction.

4. The graphic display apparatus as claimed in claim 3, wherein said area calculation means calculates a total area of the particular polygon by dividing a surface of the polygon in the device coordinate system into a plurality of triangles and obtains a sum total of areas of each of the triangles.

5. The graphic display apparatus as claimed in claim 1, wherein said area calculation means calculates a total area of the particular polygon by dividing a surface of the polygon in the device coordinate system into a plurality of triangles and obtains a sum total of areas of each of the triangles.

6. The graphic display apparatus as claimed in claim 1, wherein said geometry transforming means transforms vertex coordinates of the polygon which is described in a modeling coordinate system and normal vectors into corresponding values in a normalized projection coordinate system, and carries out a clipping and transforms the coordinate system from the normalized projection coordinate system into the device coordinate system.

7. The graphic display apparatus as claimed in claim 1, wherein said area calculation means divides a surface of the particular polygon into a plurality of triangles based on the coordinates of the device coordinate system transformed by said geometry transforming means, and obtains areas of each triangle of the plurality of triangles based upon information related to vertex coordinates of each of the triangles.

8. The graphic display apparatus as claimed in claim 1, wherein said luminance calculation means calculates the luminance based upon vertexes of the particular polygon when the shading technique selected by said shading technique selection means is one of a constant shading technique and a Gouraud shading technique.

9. The graphic display apparatus as claimed in claim 1, wherein said luminance calculation means calculates the luminance based upon dots using normal vectors between vertexes which are subjected to linear interpolation when the shading technique selected by said shading technique selection means is a Phong shading technique.

10. The graphic display apparatus as claimed in claim 1, wherein said plurality of shading techniques are selected from a group consisting of a constant shading technique, a Gouraud shading technique and a Phong shading technique.

* * * * *